United States Patent Office 3,311,661
Patented Mar. 28, 1967

3,311,661
NOVEL POLYHYDROPHENANTHRENE
DERIVATIVES
Moses Wolf Goldberg, deceased, late of Upper Montclair,
N.J., by Regina Hauser Goldberg, executrix, Upper
Montclair, N.J., and Lester Mischa Jampolsky, Upper
Montclair, and Richard Wightman Kierstead, North
Caldwell, N.J., assignors to Hoffmann-La Roche Inc.,
Nutley, N.J., a corporation of New Jersey
No Drawing. Original application Apr. 11, 1962, Ser.
No 186,651, now Patent No. 3,275,691, dated Sept.
27, 1966. Divided and this application July 27, 1965,
Ser. No. 475,629
4 Claims. (Cl. 260—586)

This application is a division of application Ser. No. 186,651, filed April 11, 1962, now U.S. Patent No. 3,275,-691, granted April 27, 1966.

The instant invention relates to polyhydrophenanthrene derivatives having utility in the pharmaceutical field and to methods for their preparation. More particularly, the instant invention relates to polyhydrophenanthrene derivatives having the formula (I)

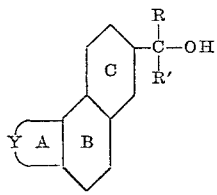

wherein R is H or lower alkyl; R' is H, lower alkyl, vinyl, or ethynyl; and Y is one of the following structures:

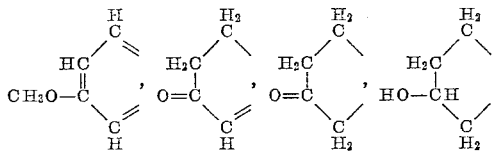

and to methods for their preparation.

The novel compounds of the invention exhibit either hormonal activity, antihormonal activity, cholesterol lowering activity, or a combination of these activities, and are useful as one or more of the following: Hypocholesterolemic agent; anti-gonadotropin, i.e. and anti-fertility agent; anti-androgen; estrogen; or anabolic agent.

The compounds of this invention have asymmetric carbon atoms and the various stereoisomers are included within the scope of this invention.

Compounds of the formula (II)

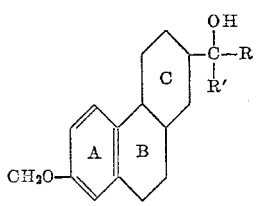

are prepared as follows:

(A) When R and R' are both hydrogen, 2-acetyl-7-methoxy - 1,2,3,4,4a,9,10,10a - octahydrophenanthrene (see U.S. 2,894,958 for its preparation) is oxidized to 7-methoxy - 1,2,3,4,4a,9,10,10a - octahydro - 2-phenanthroic acid. Suitable oxidizing agents include alkali metal hypohalites, alkali metal permanganate and chromic acid, with the alkali metal hypohalites preferred, e.g. sodium hypobromite, potassium hypochlorite, lithium hypoiodite, etc. The reaction temperature employed depends on the particular oxidizing agent used. When an alkali metal hypohalite is employed the reaction temperature is generally maintained in the range of about 0° to about 25° C. Next the carboxy group of 7-methoxy - 1,2,3,4,4a,9,10,10a-octahydro-2-phenanthroic acid is esterified with an esterification agent such as diazomethane, or an alkanol, preferably a lower alkanol, e.g. methanol or ethanol, to form the alkyl ester of 7-methoxy - 1,2,3,4,4a,9,10,10a-octahydro-2-phenanthroic acid. The alkyl ester group is then reduced, for example by treatment with a Group I metal–Group III metal mixed hydride such as lithium aluminum hydride, sodium borohydride, etc. to yield 2-hydroxymethyl - 7 - methoxy - 1,2,3,4,4a,9,10,10a-octahydrophenanthrene.

(B) When R is lower alkyl and R' is hydrogen:

(1) When the group other than hydrogen is methyl, the secondary alcohol is prepared by reducing 2-acetyl-7-methoxy - 1,2,3,4,4a,9,10,10a - octahydrophenanthrene with a reducing agent such as a Group I metal–Group III metal mixed metal hydride, by catalytic hydrogenation, or by treatment with aluminum isopropoxide to form 2-(1-hydroxyethyl) - 7-methoxy - 1,2,3,4,4a,9,10,10a - octahydrophenanthrene.

(2) When the group other than hydrogen is a $C_2$ to $C_6$ lower alkyl group, the compounds are prepared by reacting 1-vinyl-6-methoxy - 3,4-dihydronaphthalene with a $C_2$–$C_6$ alkyl vinyl ketone to form the corresponding 2-($C_3$–$C_7$) alkanoyl - 7-methoxy-1,2,3,9,10,10a-hexahydrophenanthrene according to the process disclosed in U.S. 2,894,958, and then isomerizing and reducing the isomerization product to 2-($C_3$–$C_7$) alkanoyl - 7 - methoxy-1,2,3,4,4a,9,10,10a - octahydrophenanthrene according to the method given in U.S. 2,894,958, i.e. by treatment with acid, followed by refluxing with ethylene glycol and p-toluene sulfonic acid to produce the corresponding cyclic ethylene acetal, and reduction of the acetal for example with potassium and ammonium chloride in liquid ammonia at low temperature, followed by treatment with acid to yield the corresponding octahydro product. This compound is then reduced to the corresponding $C_2$–$C_6$ alkyl secondary carbinol by means of a reducing agent, such as a Group I metal–Group III metal mixed metal hydride or aluminum isopropoxide.

(C) When neither R nor R' is hydrogen, i.e. when a tertiary carbinol is prepared, then a 2-($C_2$–$C_7$) alkanoyl-7-methoxy - 1,2,3,4,4a,9,10,10a - octahydrophenanthrene is reacted with a lower alkyl Grignard reagent when the group to be introduced is a saturated lower alkyl group, or with an alkali metal acetylide, such as lithium acetylide, when the group to be introduced is an ethynyl group. When it is desired to introduce a vinyl group the corresponding alkynyl compound is reduced with hydrogen in the presence of a suitable partially poisoned hydrogenation catalyst such as the Lindlar catalyst (see U.S. 2,681,938).

Compounds of the formula (III)

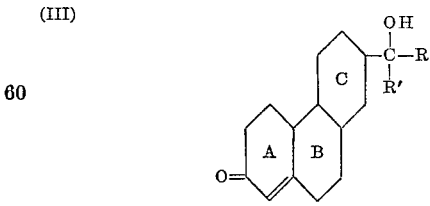

are prepared as follows:

(A) Where R and R' are both hydrogen, 2-hydroxymethyl - 7 - methoxy - 1,2,3,4,4a,9,10,10a - octahydrophenanthrene (prepared above) is reduced with lithium metal and ethanol in liquid ammonia to form 2-hydroxymethyl - 7 - methoxy - 1,2,3,4,4a,5,8,9,10,10a - decahydrophenanthrene. This compound is then hydrolyzed with an aqueous acid, such as an aqueous mineral acid, e.g. hydrochloric acid, sulfuric acid, etc., or a strong organic acid, such as acetic acid, oxalic acid, etc., to give 2-hydroxymethyl - 7 - oxo - 1,2,3,4,4a,4b,5,6,7,9,10a - dodecahydrophenanthrene.

(B) When R is lower alkyl and R' is hydrogen, a 2-($C_2$–$C_7$)-alkanoyl - 7 - methoxy - 1,2,3,4,4a,9,10,10a - octahydrophenanthrene is converted to its cyclic ethylene acetal by treatment with ethylene glycol and p-toluene sulfonic acid in a solvent according to the process described in U.S. 2,894,958. The cyclic ethylene acetal is then further reduced in liquid ammonia at a low temperature with lithium and an alcohol and the reduction product then hydrolyzed to produce 2-($C_2$–$C_7$)alkanoyl-7-oxo - 1,2,3,4,4a,4b,5,6,7,9,10a - dodecahydrophenanthrene. This compound is then reacted with pyrrolidine and p-toluene sulfonic acid to give 7-(1-pyrrolidinyl)-2-($C_2$–$C_7$)alkanoyl - 1,2,3,4,4a,4b,5,6,10,10a - decahydrophenanthrene. The latter compound is then treated with a Group I metal–Group III metal mixed metal hydride, such as lithium aluminum hydride and the product of the reduction hydrolyzed with water or an aqueous acid to give 2-[1-hydroxy-($C_2$–$C_7$)alkyl] - 7 - oxo - 1,2,3,4,4a,4b,5,6,7,9,10,10a-dodecahydrophenanthrene.

(C) When neither R nor R' is hydrogen, 7-(1-pyrrolidinyl) - 2 - ($C_2$–$C_7$)alkanoyl - 1,2,3,4,4a,4b,5,6,10,10a-decahydrophenanthrene is reacted with a lower alkyl Grignard, e.g. methyl magnesium bromide, and then hydrolyzed with water or aqueous acid to give the corresponding 2 - (dialkyl - hydroxymethyl) - 7 - oxo - 1,2,3,4, 4a,4b,5,6,7,9,10,10a-dodecahydrophenanthrene. In these compounds R and R' are both lower alkyl. When R' is ethynyl, lithium acetylide is employed in place of the alkyl Grignard, and the product is hydrolyzed with water or aqueous acid to give 2-(ethynyl-alkyl hydroxymethyl)-7 - oxo - 1,2,3,4,4a,4b,5,6,7,9,10a - dodecahydrophenanthrene. The corresponding 2-(vinyl-alkyl hydroxymethyl) - 7 - oxo - 1,2,3,4,4a,4b,5,6,7,9,10,10a - dodecahydrophenanthrene is prepared by reducing the above ethynyl compound with hydrogen in the presence of a partially poisoned catalyst, such as the Lindlar catalyst.

Compounds of the formula (IV)

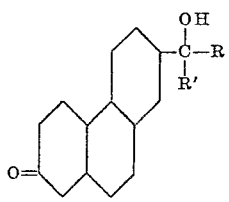

are prepared as follows:

Compounds of Formula III are reduced with a reducing agent that reduces the double bond in the ring but not the oxo group, e.g. lithium and ammonium chloride in liquid ammonia. Of course, where R' is ethynyl the ethynyl group can be further reduced by hydrogen in the presence of a Lindlar catalyst to the vinyl group, or with hydrogen in the presence of a hydrogenation catalyst such as palladium on calcium carbonate to the ethyl group.

Compounds having the formula (V)

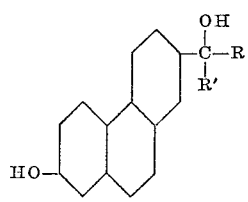

are prepared as follows:

Compounds having the Formula IV are reduced with a suitable reducing agent such as Group I metal–Group III metal mixed metal hydride or aluminum isopropoxide to give compounds of Formula V. An alternative route, where R is lower alkyl and R' is hydrogen, is to reduce 2 - ($C_2$–$C_7$)alkanoyl - 7 - oxo - 1,2,3,4,4a,4b,5,6,7,9,10, 10a-dodecahydrophenanthrene (prepared above) with lithium in liquid ammonia to the corresponding 2-($C_2C_7$)alkanoyl - 7 - oxo - 1,2,3,4,4a,4b,5,6,7,8,8a,9,10, 10a-tetradecahydrophenanthrene. This compound is then reduced with a Group I metal–Group III metal mixed metal hydride to give the corresponding 2-[1-hydroxy-($C_2$–$C_7$)alkyl] - 7 - hydroxy - 1,2,3,4,4a,4b,5,6,7,8,8a,9, 10,10a-tetradecahydrophenanthrene.

It is to be noted that the phenanthroic acids used as intermediates in the preparation of primary alcohols and the methods of preparing the phenanthroic acids are included for purposes of completeness and do not comprise part of the instant invention.

The invention will be understood more clearly from the following examples which are given for illustration purposes only and are not meant to limit the invention.

EXAMPLE 1

*Preparation of 2-hydroxymethyl-7-methoxy-1,2,3,4,4a, 9,10,10a-octahydrophenanthrene (rings B/C trans)*

A mixture of 35.74 g. of 2-acetyl-7-methoxy-1,2,3,4,9, 10-hexahydrophenanthrene, 17 ml. of ethylene glycol, and 0.25 g. of p-toluenesulfonic acid monohydrate in 240 ml. of benzene is refluxed for 5 hours with a water separator. The solution is washed twice with 50 ml. sodium carbonate and twice with 50 ml. of water. After being dried with sodium sulfate, the organic layer is stripped of solvent in vacuo; the residual viscous oil, the cyclic ethylene acetal of 2-acetyl-7-methoxy-1,2,3,4,9,10-hexahydrophenanthrene, could not be crystallized.

A solution of 30.1 g. of the cyclic ethylene acetal of 2 - acetyl - 7 - methoxy - 1,2,3,4,9,10 - hexahydrophenanthrene in 300 ml. of anhydrous ether is added, with stirring, to a solution of 13.8 g. of potassium in 900 ml. of liquid ammonia at −40°. After the solution is stirred for 45 minutes, 23 g. of ammonium chloride are added, and the ammonia is permitted to boil off while stirring is continued.

The residue is treated with ice, water and an additional 200 ml. of ether. The ether layer is separated and washed with water. The water layers are washed with 100 ml. of ether. The ether layers are combined, dried with sodium sulfate, and the solvent is removed in vacuo.

To the residue, dissolved in 300 ml. of methanol, are added 7.5 g. of oxalic acid and 75 ml. of water, and the mixture is refluxed for one hour. The methanol is removed in vacuo, the residue is diluted with 100 ml. of water and extracted with 300 ml. of ether. The organic layer is separated and washed with water. The water layers are washed with 100 ml. of ether. The combined organic layers are dried with sodium sulfate, and the solvent is removed in vacuo. The residue, 2-acetyl-7-methoxy - 1,2,3,4,4a,9,10,10a - octahydrophenanthrene (rings B/C trans) is crystallized from a small volume of ethanol, and then recrystallized from petroleum ether, M.P. 83–85°.

A solution of sodium hypobromite is prepared from 109 g. (2.73 moles) of sodium hydroxide and 160 g. (1.06 moles) of bromine in 1500 ml. of water. To this cooled solution (ice-salt freezing mixture) is added with stirring 78 g. (0.302 moles) (the additional quantity is prepared as above) of 2-acetyl-7-methoxy-1,2,3,4,4a,9, 10,10a-octahydrophenanthrene (rings B/C trans), dissolved in 1500 ml. of dioxane, at such a rate that the temperature does not rise above 10°. When the addition is complete, the cooling bath is removed and the resulting solution is stirred for one hour at room temperature. It is then concentrated in vacuo to about one quarter of its original volume and then diluted with 3 liters of water. This aqueous solution is extracted twice with ether, and is then cooled to 0° and acidified to congo red with about 600 ml. of 3 N hydrochloro acid. The precipitated product is filtered, washed with water and dried to give 78.2 g.

of crude solid. The product is dissolved in 1 liter of hot chloroform, filtered through celite, and the solution concentrated to about 250 ml. with slow addition of acetone. The substance crystallizes from the boiling solution, giving 65.8 g. of 7-methoxy-1,2,3,4,4a,9,10,10a-octahydro-2-phenanthroic acid (rings $B/C$ trans), M.P. 239–242° C. Further concentration of the mother liquors affords 6.47 g. of material melting at 235–240° C. Total yield 74.27 g. (92%).

A solution of 63.25 g. of the above acid in 500 ml. of cold methanol is esterified in the usual manner with an excess of diazomethane in ether. Removal of the solvents in vacuo gives 66 g. of crude product, M.P. 78.5–81.5° C. A sample is crystallized twice from hexane to give the ester as colorless needles, M.P. 85.5–86° C.

To a stirred solution of 20 g. of lithium aluminum hydride in 350 ml. of anhydrous ether is added at room temperature a solution of 61 g. of the ester in 1000 ml. of ether. After 30 minutes the addition is completed, the reaction mixture is then heated under reflux for 30 minutes, and is allowed to stand at room temperature overnight. Excess lithium aluminum hydride is then decomposed with an excess of ethyl acetate, and dilute sulfuric acid added until the white precipitate goes into solution. This mixture is extracted with ether, and the ether solution washed with water and then with 5% sodium bicarbonate solution. Removal of the solvent gives the product as a colorless solid, which is crystallized from methylene chloride-ether to give 46.4 g. of pure 2-hydroxymethyl - 7 - methoxy-1,2,3,4,4a,9,10,10a-octahydrophenanthrene (rings $B/C$ trans), M.P. 94–96° C. Reworking of the mother liquors gives a further 3.88 g., M.P. 92–94° C. Total yield 50.28 g. (92%). Two further crystalliaztions from methylene chloride-ether gives a product melting at 94.5° C.

This compound exhibits strong anti-gonadotropic and hypocholesterolemic activity.

EXAMPLE 2

*Preparation of 2-(1-hydroxyethyl)-7-methoxy-1,2,3,4,4a, 9,10,10a-octahydrophenanthrene (rings B/C trans)*

To a stirred solution of 20 g. of lithium aluminum hydride in 350 ml. of anhydrous ether is added at room temperature a solution of 60 g. of 2-acetyl-7-methoxy-1,2,3, 4,4a,9,10,10a-octahydrophenanthrene (rings $B/C$ trans) in 1000 ml. of ether. After 30 minutes the addition is completed and the reaction mixture is then heated under reflux for 15 minutes. Excess lithium aluminum hydride is decomposed with an excess of ethyl acetate. Then water is added and the resulting mixture extracted with ether and the ether extract washed with water and then with 5% sodium bicarbonate solution. The solvent is removed under vacuum and the product crystallized from methylene chloride-ether to give 2-(1-hydroxyethyl)-7-methoxy - 1,2,3,4,4a,9,10,10a - octahydrophenanthrene (rings $B/C$ trans).

EXAMPLE 3

*Preparation of 2-(1-hydroxyisopropyl)-7-methoxy-1,2,3, 4,4a,9,10,10a-octahydrophenanthrene (rings B/C trans)*

To a solution of methylmagnesium bromide (from 2.8 g. of magnesium in 15 ml. of ether and 11.6 g. of methyl bromide in 100 ml. of ether) is added a solution of 20 g. of 2 - acetyl - 7-methoxy-1,2,3,4,4a,9,10,10a-octahydrophenanthrene (rings $B/C$ trans) in 100 ml. of benezene at such a rate that the reaction maintains gentle reflux. After stirring for one hour at room temperature, the mixture is treated with saturated ammonium chloride solution and the product isolated in ether-methylene chloride (2.5:1). The organic layers are washed with 5% sodium bicarbonate solution, combined, dried ($Na_2SO_4$) and evaporated. The resulting oil crystallizes on addition of ether and hexane. Filtration gives 20.2 g. (95%) of colorless 2-(1-hydroxy-isopropyl)-7-methoxy-1,2,3,4,4a, 9,10,10a-octahydrophenanthrene (rings $B/C$ trans), M.P. 75–76° C. A sample is crystallized twice from ether-hexane, M.P. 76–77° C.

This compound is an active anti-gonadotropin.

EXAMPLE 4

*Preparation of 2-hydroxymethyl-7-oxo-1,2,3,4,4a,4b,5,6,7, 9,10,10a-dodecahydrophenanthrene (rings B/C anti-trans)*

A solution of 8.0 g. of 2-hydroxymethyl-7-methoxy-1, 2,3,4,4a,9,10,10a - octahydrophenanthrene (rings $B/C$ trans) (the product of Example 1) in 600 ml. of dimethoxyethane and 150 ml. of ethanol is added, over 20 minutes, to a solution of 30 g. of lithium in 3 liters of liquid ammonia. After stirring for 20 minutes, the blue color is discharged by the addition of 420 ml. of ethanol and the ammonia is allowed to evaporate. Excess solvents are removed in vacuo, and the residue is diluted with water and extracted with ether. The ether layer is washed twice with water and dried over anhydrous sodium sulfate. Removal of the solvent gives a colorless solid, which is crystallized form methylene chloride-ether to give 5.41 g. of 2-hydroxymethyl-7-methoxy-1,2,3,4,4a, 5,8,9,10,10a-decahydrophenanthrene (rings $B/C$ trans), M.P. 108–110° C. Concentration of the mother liquors affords a further 0.87 g. of product, M.P. 104–107° C. Total yield 6.28 g. (78%). Two further crystallizations from methylene chloride-ether gives a sample melting at 111–113° C.

A solution of 6.26 g. of the above decahydrophenanthrene in 620 ml. of acetone is heated under reflux for one hour with 150 ml. of 3 N hydrochloric acid in a nitrogen atmosphere. The resulting solution is concentrated in vacuo to about one third its original volume and is then diluted with saturated sodium chloride solution. This mixture is extracted with ether, and the ether layers are washed with brine, 5% sodium bicarbonate and water. Removal of the dried solvent gives a colorless solid, which is crystallized from methylene chloride-ether to give 4.42 g. of 2-hydroxymethyl - 7 - oxo - 1,2,3,4,4a,4b,5,6,7,9,10, 10a-dodecahydrophenanthrene (rings $A/B/C$ anti-trans), M.P. 108–109° C. Concentration of the mother liquors gives a further 0.78 g., M.P. 104–107° C. Total yield 5.2 g. (88%). Recrystallization from methylene chloride-ether and from ether-hexane gives a pure sample, M.P. 108–109° C.

This compound exhibits androgenic activity.

EXAMPLE 5

*Preparation of 2-(1-hydroxyethyl)-7-oxo-1,2,3,4,4a,4b,5, 6,7,9,10,10a - dodecahydrophenanthrene (rings A/B/C anti-trans)*

A mixture of 8.80 g. of 2-acetyl-7-oxo-1,2,3,4,4a,4b,5,6, 7,9,10,10a-dodecahydrophenanthrene (rings $A/B/C$ anti-trans) (see Example 5, U.S. 2,894,958), 200 ml. of benzene, 12.5 ml. of pyrrolidine and 100 mg. of p-toluenesulfonic acid monohydrate is heated under reflux, using a graduated water trap to collect the water of reaction. After two hours, the mixture is cooled and evaporated to dryness. The residue is crystallized from methylene chloride-ether to give 8.88 g. (74%) of 7-(1-pyrrolidinyl)-2-acetyl-1,2,3,4,4a,4b,5,6,10,10a - decahydrophenanthrene (rings $A/B/C$ anti-trans), M.P. 109–112° C. A sample is crystallized twice from methylene chloride-ether, M.P. 110–113.5° C.

To a stirred solution of 6.0 g. of lithium aluminum hydride in 900 ml. of ether is added a solution of 9.0 g. of the above pyrrolidinyl derivative in 150 ml. of benzene and 150 ml. of ether over a period of 8 minutes. The resulting mixture is then heated under reflux for 15 minutes. It is then cooled and treated with 60 ml. of ethyl acetate, followed by 100 ml. of water. The ether is then removed in vacuo, and the resulting mixture is heated under reflux (nitrogen atmosphere) for 90 minutes with a buffered solution of 24 g. of sodium acetate, 60 ml. of water, 24 ml. of acetic acid and 300 ml. of methanol. It is then cooled and most of the methanol is removed under vacuum. To the residue is added 400 ml. of 3 N hydrochloric acid and the mixture is then extracted with ether-methylene chloride (2.5:1). The organic layers are washed with dilute sodium bicarbonate solution, dried (anhydrous $Na_2SO_4$), and evaporated to afford 5.0 g. of yellow solid. This material is taken up in benzene, filtered through a short column of neutral alumina, and then crystallized from methylene chloride-ether to give 3.60 g. (40%) of 2-(1-hydroxyethyl) - 7-oxo-1,2,3,4,4a,4b,5,6,7,9,10,10a - dodecahydrophenanthrene (rings *A/B/C* anti-trans) as a colorless solid, M.P. 111–114.5° C. A sample is recrystallized twice from methylene chloride-ether, M.P. 115–118° C.

This compound exhibits androgenic and anabolic activity.

EXAMPLE 6

*Preparation of 2-(1-hydroxyisopropyl)-7-oxo-1,2,3,4,4a, 4b,5,6,7,9,10,10a - dodecahydrophenanthrene (rings A/B/C anti-trans)*

To a stirred solution of 48.5 g. of methylmagnesium bromide (from 48.5 g. of magnesium in 194 ml. of ether and 209 g. of methyl bromide in 1940 ml. of ether) is added a solution of 66.0 g. of 7-(1-pyrrolidinyl)-2-acetyl-1,2,3,4,4a,4b,5,6,10,10a - decahydrophenanthrene (rings *A/B/C* anti-trans) in 1160 ml. of benzene and 1160 ml. of ether over a 35 minute period. After heating under reflux for 15 minutes, the mixture is cooled in ice water and then treated with 1 liter of saturated ammonium chloride solution. It is then diluted with 400 ml. of water, filtered through celite (to break an emulsion) and the aqueous layer separated and extracted twice with ether. The organic layers are washed with water, and then with saturated ammonium chloride solution, dried (anhydrous $Na_2SO_4$) and evaporated to give an amber oil.

To the above oil is added a buffered solution of 186 g. of sodium acetate, 465 ml. of water, 186 ml. of glacial acetic acid and 2320 ml. of methanol, and the resulting mixture is heated under reflux in an atmosphere of nitrogen for a period of one hour. It is then cooled and most of the methanol removed under vacuum. To the resulting cooled suspension is added 3 liters of 3 N hydrochloric acid and the resulting mixture extracted three times with ether-methylene chloride (2.5:1). The organic layers are washed three times with 5% sodium bicarbonate solution, dried (anhydrous $Na_2SO_4$) and evaporated to give an amber oil, which is absorbed from benzene onto neutral alumina. Elution with benzene and crystallization of the resulting solid from ether-hexane gives 23.7 g. (41%) of 2-(1-hydroxyisopropyl - 7 - oxo - 1,2,3,4,4a,4b,5,6,7,9,10,10a-dodecahydrophenanthrene (rings *A/B/C* anti-trans), M.P. 116–118.5° C.

This compound exhibits anti-gonadotropic, androgenic and anabolic activity.

EXAMPLE 7

*Alternate method for preparing 2-(1-hydroxyisopropyl)-7-oxo - 1,2,3,4,4a,4b,5,6,7,9,10,10a - dodecahydrophenanthrene (rings A/B/C anti-trans)*

A solution of 20.0 g. of 2-(1 - hydroxyisopropyl)-7-methoxy - 1,2,3,4,4a,9,10,10a - octahydrophenanthrene (rings *B/C* trans) (prepared in Example 3) in 1000 ml. of dimethoxyethane and 250 ml. of ethanol is added over 20 minutes to a solution of 50 g. of lithium in 5000 ml. of liquid ammonia. After stirring for 20 minutes, the blue color is discharged by the addition of 500 ml. of ethanol and the ammonia is allowed to evaporate. Excess solvents are removed under vacuum, the residue is diluted with 3 liters of water and the product isolated by extraction with ether. The ether layer is washed with water, dried (anhydrous $Na_2SO_4$) and evaporated. The resulting solid is crystallized from ether-hexane to afford 13.9 g. (69%) of colorless 2-(1-hydroxyisopropyl)-7-methoxy - 1,2,3,4,4a,5,8,9,10,10a - decahydrophenanthrene (rings *B/C* trans), M.P. 89–91.5° C. Two further crystallizations from ether-hexane give a product melting at 91.5–92.5° C.

A solution of 12.18 g. of the above decahydrophenanthrene in 250 ml. of methanol and 50 ml. of 3 N hydrochloric acid is allowed to stand overnight at room temperature in an atmosphere of nitrogen. It is then poured into ice water and the product isolated with ether. The ether layer is washed with 5% sodium bicarbonate solution, saturated sodium chloride solution, dried (anhydrous $Na_2SO_4$), and evaporated. The resulting solid is crystallized from ether-hexane to give 10.14 g. (88%) of colorless 2-(1-hydroxyisopropyl)-7-oxo-1,2,3,4,4a,4b,5,6,7,9,10,10a - dodecahydrophenanthrene (rings *A/B/C* anti-trans), M.P. 118–119.5° C. Two further crystallizations from ether-hexane give a pure product melting at 119.5–120.5° C.

EXAMPLE 8

*Preparation of 2-(1-hydroxyisopropyl)-7-oxo-1,2,3,4,4a, 4b,5,6,7,9,10,10a - dodecahydrophenanthrene (rings B/C, cis)*

To 102.5 g. of 2-acetyl-7-methoxy-1,2,3,4,9,10-hexahydrophenanthrene (prepared in Example 2 of U.S. 2,894,958) in 3000 ml. of ethyl acetate is added 10 g. of 10% palladium on charcoal and the mixture hydrogenated at room temperature and atmospheric pressure. The theoretical amount of hydrogen is taken up in one hour. The solvent is removed and the residue crystallized from petroleum ether to give 75.6 g. of 2-acetyl-7-methoxy - 1,2,3,4,4a,9,10,10a - octahydrophenanthrene (predominant isomer, rings *B/C* cis) melting at 85–86° C.; yield 71%.

Concentration of the mother liquor yields 21 g. of 2-acetyl-7-methoxy-1,2,3,4,4a,9,10,10a - octahydrophenanthrene (stable isomer, rings *B/C* cis) melting at 65–66° C., yield 21%.

The predominant isomer crystallized above is converted into the stable isomer by equilibration with sodium ethoxide.

In a 1-liter, 3-neck, round-bottom flask fitted with a stirrer, dropping funnel, and a condenser, is placed 4.2 g. of magnesium turnings in 25 ml. of anhydrous ether. To this is added a solution of 17.4 g. of methyl bromide in 150 ml. of ether. The addition is carried out at such a rate as to maintain gentle reflux. After the addition is completed, 150 ml. of benzene containing 29.1 g. of 2-acetyl-7-methoxy - 1,2,3,4,4a,9,10,10a - octahydrophenanthrene (stable isomer, rings *B/C* cis) is added slowly with gentle heating. The mixture is stirred for one hour at room temperature. The excess Grignard reagent is destroyed by careful addition of a saturated ammonium chloride solution. The layers are separated, the aqueous layer extracted twice with ether, the ether extracts combined, dried over anhydrous sodium sulfate, and evaporated to dryness. The residue is crystallized from n-hexane yielding 25.3 g. of 2-(1-hydroxyisopropyl)-7-methoxy - 1,2,3,4,4a,9,10,10a - octahydrophenanthrene (rings *B/C* cis) melting at 102–103° C., yield 85%.

To 5 liters of liquid ammonia is added 20.3 g. of 2-(1-hydroxyisopropyl)-7-methoxy - 1,2,3,4,4a,9,10,10a-octahydrophenanthrene (rings *B/C* cis) in 1 liter of ether while stirring 45 g. of lithium wire in small pieces are added over a 1-hour period. The stirring is continued for an additional hour after which 700 ml. of ethanol is added dropwise. The ammonia is then allowed to evaporate, 2 liters of water are added thereto, and the product is extracted into ether. The ether extract is washed with water and with brine, then dried and evaporated to dryness to yield 20 g. of crude product. Crystallization from ether gives 15.6 g. of 2-(1-hydroxyisopropyl)-7-methoxy - 1,2,3,4,4a,5,8,9,10,10a - decahydrophenanthrene (rings B/C cis) melting at 94–96° C., yield 76%.

120 ml. of 3 N hydrochloric acid is added slowly with stirring to 11.9 g. of 2-(1-hydroxyisopropyl) - 7 - methoxy-1,2,3,4,4a,5,8,9,10,10a - decahydrophenanthrene (rings B/C cis) dissolved in 500 ml. of methanol maintained at 15° C. under nitrogen. The mixture is then heated to 60° C. and held at this temperature for one hour. Two liters of water are added and the product extracted into methylene chloride. The organic extract is washed with water and with brine, dried over anhydrous sodium sulfate and evaporated to dryness. Crystallization of the residue from acetone yields 4.4 g. of 2-(1-hydroxyisopropyl)-7-oxo - 1,2,3,4,4a,4b,5,6,7,9,10,10a - dodecahydrophenanthrene (rings B/C cis) melting at 164–170° C. A further recrystallization gives a product melting at 170–172° C., yield 30%. This compound exhibits antigonadotropic activity.

EXAMPLE 9

*Preparation of 2-(1-ethynyl-1-hydroxyethyl)-7-oxo-1,2,3,4,4a,4b,5,6,7,9,10,10a-dodecahydrophenanthrene (rings A/B/C anti-trans)*

A slow stream of acetylene is bubbled through a cooled (Dry Ice-acetone) solution of 16.4 g. of lithium in 2 liters of liquid ammonia until the blue color is discharged (about 6 hours). To this stirred mixture is added a solution of 65.6 g. of 7-(1-pyrrolidinyl)-2-acetyl-1,2,3,4,4a,4b,5,6,10,10a-decahydrophenanthrene (rings A/B/C anti-trans) (prepared in Example 5) in 817 ml. of dimethoxyethane over a 15-minute period. After stirring for 25 minutes, the cooling bath is removed and is replaced with a bath of warm water. When all of the ammonia has evaporated, 800 ml. of benzene are added and the mixture is allowed to stir at room temperature overnight under nitrogen. The solvent is then removed under vacuum and the residue is diluted with 900 ml. of ether. The flask is then cooled in a mixture of ice and water and the stirred mixture treated with 2 liters of saturated ammonium chloride solution. The organic phase is separated and the aqueous layer is extracted twice with ether-methylene chloride (2.5:1). The organic layers are washed once with water; then twice with saturated ammonium chloride solution, dried (anhydrous $Na_2SO_4$) and evaporated to give 61 g. of reddish oil.

To the above oil added a buffered solution of 96.5 g. of sodium acetate, 219 ml. of water, 96.5 ml. of acetic acid and 1100 ml. of methanol and the resulting mixture heated under reflux for one hour in an atmosphere of nitrogen. It is then cooled and most of the methanol is removed under vaccum. To the cooled (ice bath) residue is added 2 liters of 3 N hydrochloric acid and the mixture then extracted three times with ether-methylene chloride (2.5:1). The organic layers are washed four times with 5% sodium bicarbonate solution, dried (anhydrous $Na_2SO_4$) and evaporated to give 40.7 g. of amber oil, which is absorbed from benzene-hexane (3:1) onto 625 g. of neutral alumina. Elution with benzene and benzene-ether (4:1), and crystallization of the resulting solid from methylene chloride-ether gives 20.2 g. (34%) of crude 2-(1-ethynyl-1-hydroxyethyl)-7-oxo-1,2,3,4,4a,4b,5,6,7,9,10,10a - dodecahydrophenanthrene (rings A/B/C anti-trans) (pale yellow), M.P. 119–144° C. A further 1.12 g., M.P. 113–125° C., is recovered from the mother liquor. A pure sample is obtained by recrystallization four times from aqueous methanol to give a colorless solid, M.P. 144–155° C.

This compound exhibits anti-androgenic activity.

EXAMPLE 10

*Preparation of 2-(1-vinyl-1-hydroxyethyl)-7-oxo-1,2,3,4,4a,4b,5,6,7,9,10,10a - dodecahydrophenanthrene (rings A/B/C anti-trans)*

A solution of 9.0 g. of the ethynyl carbinol of Example 9 in 210 ml. of hexane, 73 ml. of pyridine and 0.42 ml. of quinoline is hydrogenated over 850 mg. of Lindlar's catalyst (U.S. 2,681,938) ($t=23°$ C., $p=764$ mm.). After the absorption of 735 ml. of hydrogen (0.92 mole) the rate of hydrogenation markedly decreases and the reaction is stopped. The catalyst is removed by filtration through celite. The filtrate is diluted with water and is extracted three times with ether. The organic layers are washed three times with water; then twice with 3 N hydrochloric acid, and twice with 5% sodium bicarbonate solution. The organic layers are dried (anhydrous $Na_2SO_4$) and evaporated to yield a pale yellow solid which is crystallized from ether-hexane to give 7.90 g. (87%) of pale yellow 2-(1-vinyl-1-hydroxyethyl)-7-oxo-1,2,3,4,4a,4b,5,6,7,9,10,10a - dodecahydrophenanthrene (rings A/B/C anti-trans), M.P. 101.5–103.5° C. The melting point is not altered on further crystallization from ether-hexane.

This compound has anti-androgenic activity.

EXAMPLE 11

*Preparation of 2-(1-ethyl-1-hydroxyethyl)-7-oxo-1,2,3,4,4a,4b,5,6,7,9,10,10a - dodecahydrophenanthrene (rings A/B/C anti-trans)*

A. *By hydrogenation of 2-(1-ethynyl-1-hydroxyethyl)-7 - oxo-1,2,3,4,4a,4b,5,6,7,9,10,10a - dodecahydrophenanthrene (rings A/B/C anti-trans).*—A solution of 272 mg. of 2-(1-ethynyl-1-hydroxyethyl)-7-oxo-1,2,3,4,4a,4b,5,6,7,9,10,10a-dodecahydrophenanthrene (rings A/B/C anti-trans) in 4 ml. of benzene and 3.0 ml. of hexane is hydrogenated over 59 mg. of 5% palladium on calcium carbonate ($t=23°$ C., $p=768$ mm.). After the absorption of 47 ml. of hydrogen (theory for 2 moles = 48 ml.) the rate of hydrogenation markedly decreases and the reaction is stopped. The catalyst is removed by filtration through celite and the filtrate is evaporated to dryness under vacuum to yield a colorless oil. The compound is crystallized from ether-hexane to give 135 mg. (49%) of colorless 2-(1 - ethyl - 1 - hydroxyethyl)-7-oxo-1,2,3,4,4a,4b,5,6,7,9,10,10a - dodecahydrophenanthrene (rings A/B/C anti-trans), M.P. 76–81° C. One further crystallization from ether-hexane gives a product melting at 78–82° C.

B. *By hydrogenation of 2-(1-vinyl-1-hydroxyethyl)-7-oxo - 1,2,3,4,4a,4b,5,6,7,9,10,10a - dodecahydrophenanthrene (rings A/B/C anti-trans).*—A solution of 274 mg. of 2-(1-vinyl - 1 - hydroxyethyl)-7-oxo-1,2,3,4,4a,4b,5,6,7,9,10,10a-dodecahydrophenanthrene (rings A/B/C anti-trans) in 5.0 ml. of benzene and 5.0 ml. of hexane is hydrogenated over 50 mg. of 5% palladium on calcium carbonate ($t=24°$ C., $p=770$ mm.). After the absorption of 19.5 ml. of hydrogen (theory for 1.0 mole=24.1 ml.) the uptake ceases. The catalyst is removed by filtration through celite and the filtrate is evaporated to dryness under vacuum to yield a colorless oil. The compound is crystallized from ether-hexane to give 2200 mg. (80%) of colorless product, M.P. 78–84° C. One further crystallization from ether-hexane gives 110 mg. of colorless product of M.P. 77–80.5° C. There is no melting point depression when the compound is mixed with the sample prepared via method A.

C. *By treatment of 7-(1-pyrrolidinyl)-2-acetyl-1,2,3,4,4a,4b,5,6,10,10a-decahydrophenanthrene (rings A/B/C anti-trans) with ethylmagnesium bromide.*—To a stirred solution of ethylmagnesium bromide (from 19.5 g. of magnesium in 70 ml. of ether and 61 ml. of ethyl bromide in 250 ml. of ether) is added a solution of 24.0 g. of 7-(1-pyrrolidinyl) - 2 - acetyl - 1,2,3,4,4a,4b,5,6,10,10a-decahydrophenanthrene (rings A/B/C anti-trans) in 400 ml. of benzene and 400 ml. of ether over a period of 35 minutes. After heating under reflux for 45 minutes, the mixture is cooled in ice water and is then treated with 400 ml. of saturated ammonium chloride solution. It is then diluted with 300 ml. of water and is extracted two times with ether-methylene chloride (2.5:1). The organic layers are washed with water and saturated sodium chloride solution, and are then combined, dried (anhydrous Na$_2$SO$_4$) and evaporated to give an amber oil.

To the above oil is added a solution of 48 g. of sodium acetate, 120 ml. of water, 48 ml. of acetic acid and 600 ml. of methanol, and the resulting mixture is heated under reflux in an atmosphere of nitrogen for one hour. It is then cooled and most of the methanol is removed under vacuum. To the resulting cooled suspension is added 800 ml. of 3 N hydrochloric acid and the resulting mixture is extracted three times with ether-methylene chloride (2.5:1). The organic layers are washed twice with 5% sodium bicarbonate solution, dried (anhydrous Na$_2$SO$_4$) and evaporated to give an amber oil, which is adsorbed from benzene onto 250 g. of neutral alumina. Elution with benzene and benzene-ether (9:1) and crystallization of the resulting oil from ether-hexane gives 5.08 g. (23%) of colorless product, M.P. 77.5–81° C. There is no melting point depression when the compound is mixed with the sample prepared via method A. The infrared spectra of the two samples are identical.

This compound exhibits anti-androgenic activity.

EXAMPLE 12

*Preparation of 2-(1-ethynyl - 1 - hydroxyethyl)-7-oxo-1,2,3,4,4a,4b,5,6,7,8,8a,9,10,10a - tetradecahydrophenanthrene (rings A/B/C trans-anti-trans)*

In a cooled (Dry Ice-acetone) 12-liter flask fitted with an efficient stirrer and two drying towers (potassium hydroxide) is added 3.5 liters of liquid ammonia, followed by 7.0 g. of lithium. After stirring for 5 minutes, a solution of 25.0 g. of 2-(1-ethynyl-1-hydroxyethyl)-7-oxo - 1,2,3,4,4a,4b,5,6,7,9,10,10a - dodecahydrophenanthene (rings A/B/C anti-trans) in 700 ml. of dimethoxyethane is added over two minutes. The mixture is stirred for 5½ minutes and the blue color is then discharged by the addition of 175 g. of ammonium chloride. The ammonia is allowed to evaporate overnight and the remaining solvent is removed under vacuum. The residue is treated with 2 liters of water and is extracted three times with ether-methylene chloride (2.5:1). The organic layers are washed with water, dried (anhydrous Na$_2$SO$_4$) and evaporated to give a pale yellow oil which is absorbed from benzene onto 200 g. of neutral alumina. Elution with benzene gives solid 2-(1-ethynyl-1-hydroxyethyl) - 7 - oxo - 1,2,3,4,4a,4b,5,6,7,8,8a,9,10,10a-tetradecahydrophenanthene (rings A/B/C trans-anti-trans) (M.P. 101–121° C.) which is crystalled from ether-hexane to give 22.8 g. (64.5%) of pale yellow solid, M.P. 106–132° C. A sample is crystallized twice from ether-hexane to give the product as a colorless solid, M.P. 115–143° C.

This compound exhibits anti-androgenic activity.

EXAMPLE 13

*Preparation of 2-(1-ethyl - 1 - hydroxyethyl)-7-oxo-1,2,3,4,4a,4b,5,6,7,8,8a,9,10,10a - tetradecahydrophenanthrene (rings A/B/C trans-anti-trans)*

A solution of 9.34 g. of 2-(1-ethynyl-1-hydroxyethyl)-1,2,3,4,4a,4b,5,6,7,8,8a,9,10,10a - tetradecahydrophenanthrene (rings A/B/C trans-anti-trans), prepared in Example 11, in 138 ml. of benzene and 107 ml. of hexane is hydrogenated over 1.73 g. of 5% palladium on calcium carbonate ($t=23°$ C., $p=762$ mm.). After the absorption of 1410 ml. of hydrogen (theory for 2 moles=1660 ml.) the uptake ceases. The catalyst is removed by filtration through celite and the filtrate is evaporated to dryness under vacuum. The residue is crystallized from ether-hexane to give 7.22 g. (76%) of pale yellow product, M.P. 86–96.5° C. A small sample is filtered through neutral alumina and is crystallized from ether-hexane to give 2-(1-ethyl-1-hydroxyethyl) - 1,2,3,4,4a,4b,5,6,7,8,8a,9,10,10a - tetradecahydrophenanthrene (rings A/B/C trans-anti-trans) as a colorless solid, M.P. 89–98° C.

This compound exhibits anti-androgenic activity.

EXAMPLE 14

*Preparation of 2-(1-vinyl - 1 - hydroxyethyl)-7-oxo-1,2,3,4,4a,4b,5,6,7,8,8a,9,10,10a - tetradecahydrophenanthrene (rings A/B/C trans-anti-trans)*

A solution of 8.0 g. of 2-(1-ethynyl-1-hydroxyethyl)-7 - oxo - 1,2,3,4,4a,4b,5,6,7,8,8a,9,10,10a - tetradecahydrophenanthrene (rings A/B/C trans-anti-trans) in 185 ml. of hexane, 65 ml. of pyridine, and 0.35 ml. of quinoline is hydrogenated over 745 mg. of Lindlar's catalyst ($t=23°$ C., $p=755$ mm.). After the absorption of 550 ml. of hydrogen (theory for 1.0 mole=714 ml.) the uptake ceases.

The catalyst is removed by filtration through celite and the filtrate is diluted with water and is extracted twice with ether-methylene chloride (2.5:1). The organic phases are washed twice with 3 N hydrochloric acid and twice with sodium bicarbonate solution. The organic layers are combined, dried (anhydrous Na$_2$SO$_4$) and evaporated to dryness to yield a solid which is crystallized from ether-hexane to give 7.25 g. (90%) of very light yellow product, M.P. 98–103° C. A small sample is filtered through neutral alumina and is crystallized from ether-hexane to give the product, 2-(1-vinyl-1-hydroxyethyl) - 7 - oxo - 1,2,3,4,4a,5,6,7,8,8a,9,10,10a-tetradecahydrophenanthrene (rings A/B/C trans-anti-trans) as a colorless solid, M.P. 93–103° C.

This compound exhibits anti-androgenic activity.

EXAMPLE 15

*Preparation of 2-(1-hydroxyethyl)-7-hydroxy-1,2,3,4,4a, 4b,5,6, 7, 8, 8a, 9, 10, 10a - tetradecahydrophenanthrene (rings A/B/C trans-anti-trans)*

A solution of 10.0 g. of 2-acetyl-7-oxo-1,2,3,4,4a,4b, 5,6,7,9,10,10a-dodecahydrophenanthrene (rings A/B/C anti-trans) in 200 ml. of a dioxane-ether (1:1) is added over 5 minutes to a stirred solution of 2.25 g. of lithium in 400 ml. of liquid ammonia. After stirring for 10 minutes, the blue color is discharged by the addition of 100 g. of ammonium chloride and the ammonia is allowed to evaporate. The residue is diluted with 500 ml. of water and the product is extracted with ether. The ether solution is washed twice with water, dried (anhydrous Na$_2$SO$_4$) and evaporated to give a yellow oil. The latter oil is dissolved in 250 ml. of acetone and is treated at room temperature with about 11 ml. of chromic acid oxidation mixture, the excess reagent being destroyed with isopropyl alcohol. The solution is filtered, the solvents are evaporated, and the residue is diluted with water and is then extracted with ether. The ether solution is washed with 5% sodium bicarbonate solution, dried (anhydrous Na$_2$SO$_4$) and evaporated to give a pale yellow solid. The latter is taken up in benzene, filtered through a short column of neutral alumina, and is crystallized from methylene chloride-hexane-ether to give 6.44 g. (64%) of 2-acetyl-7 - oxo - 1,2,3,4,4a,4b,5,6,7,8,8a,9,10,10a - tetradecahydrophenanthrene (rings A/B/C trans-anti-trans), M.P. 86–91° C., raised by several crystallizations from the same solvent system to 90–91.5° C.

This compound exhibits anti-androgenic activity.

To a solution of 7.24 g. of the above compound in 290 ml. of methanol is added a solution of sodium borohydride (13.0 g.) in 50 ml. of water. After standing at room temperature for two hours, most of the methanol is removed under vacuum and the residue is diluted with 450 ml. of cold water. The resulting precipitate is filtered, washed with water, dried, and crystallized from aqueous methanol to yield 4.55 g. (62%) of colorless 2-(1-hydroxyethyl) - 7 - hydroxy - 1,2,3,4,4a,4b,5,6,7,8,8a,9,10, 10a-tetradecahydrophenanthrene (rings A/B/C trans-anti-trans), M.P. 150–166° C. A sample is crystallized twice from aqueous methanol, M.P. 162.5–171.5° C.

This compound exhibits androgenic and anabolic activity.

EXAMPLE 16

*Preparation of 2-hydroxymethyl-7-methoxy-1,2,3,4,4a,9, 10,10a-octahydrophenanthrene (rings B/C cis)*

A solution of 102.5 g. of 2-acetyl-7-methoxy-1,2,3,4, 9,10-hexahydrophenanthrene in 3000 ml. of ethyl acetate is hydrogenated at room temperature and atmospheric pressure over 10.0 g. of 10% palladium on carbon. After the absorption of 1 mole of hydrogen, the rate of hydrogenation markedly decreases and the reaction is stopped. The mixture is filtered through celite and evaporated to dryness to give a colorless oil.

The oily residue is crystallized from petroleum ether to give 75.6 g. of 2-acetyl-7-methoxy-1,2,3,4,4a,9,10,10a-octahydrophenanthrene (rings B/C cis, isomer 2) of M.P. 84.5–87° C. Concentration of the mother liquors yields 21 g. of 2-acetal-7-methoxy-1,2,3,4,4a,9,10,10a-octahydrophenanthrene (rings B/C cis, isomer 1) of M.P. 65–66° C.

To a solution of 12.05 g. of isomer 2 in 350 ml. of glacial acetic acid is added 12.0 ml. of 30% hydrogen bromide in glacial acetic acid and the resulting mixture is allowed to stand overnight at room temperature. It is then poured into 2000 ml. of water and extracted with ether, washed twice with water, twice with 5% sodium bicarbonate solution, once with water and dried (anhydrous $Na_2SO_4$). Removal of the solvent gives an oil which is crystallized from ether-hexane to give 8.92 g. (74%) of crude isomer 1, M.P. 60–66°. One further crystallization from methanol gives 6.02 g. of product, M.P. 66–67°. Crystallization from ether-hexane gives a pure sample, M.P. 64.5–66°.

The semicarbazone of the product has a M.P. of 226–228° C.

To a solution of 500 mg. of isomer 2 in 15 ml. of anhydrous methanol is added 250 mg. of sodium methoxide and the resulting solution is heated under reflux for 2 hours. It is then concentrated under vacuum to about 5 ml. and this residue is diluted with 25 ml. of water. The product is isolated with methylene chloride-ether (2.5:1), washed with water, dried (anhydrous $Na_2SO_4$) and evaporated to give an oil which is crystallized from ether-hexane to yield 302 mg. (60%) of crude isomer 1, M.P. 60.5–65°.

A solution of sodium hypobromite is prepared from 7.0 g. of sodium hydroxide and 3.5 ml. of bromine in 100 ml. of water. To this cooled solution (ice-salt freezing mixture) is added with stirring 5.0 g. of 2-acetyl-7-methoxy-1,2,3,4,4a,9,10,10a-octahydrophenanthrene (rings B/C cis, isomer 1), dissolved in 100 ml. of dioxane, at such a rate (about 20 minutes) that the temperature does not rise above 10°. When the addition is complete, the cooling bath is removed and the resulting solution is stirred for 1.5 hours at room temperature. It is then concentrated in vacuo to about one third its original volume and diluted with 500 ml. of water. This solution is extracted twice with ether and then cooled and acidified to congo red with 3 N hydrochloric acid. The resulting precipitate is filtered, washed with water and dried to give 4.98 g. of colorless solid, M.P. 218.5–222°. One crystallization from acetonitrile gives 4.25 g. (84%) of 7-methoxy - 1,2,3,4,4a,9,10,10a - octahydro - 2 - phenanthrenecarboxylic acid (rings B/C cis, isomer 1).

A solution of 4.0 g. of 7-methoxy-1,2,3,4,4a,9,10,10a-octahydro-2-phenanthrenecarboxylic acid (rings B/C cis, isomer 1) in 30 ml. of methanol is esterified with an excess of diazomethane in ether. The solvents are removed under vacuum leaving an oil which is crystallized from hexane to give 3.39 g. of crude product, M.P. 55.5–57.5° C. An additional 0.51 g. of product, M.P. 55.5–57.5° C. is recovered from the mother liquors. The combined products are crystallized from ether-hexane to give the pure ester, M.P. 56–58° C.

To a stirred solution of 650 mg. of lithium aluminum hydride in 10 ml. of ether is added at room temperature a solution of 1.95 g. of the above ester in 35 ml. of ether over a thirty-minute period. After the addition is completed, the mixture is heated under reflux for 30 minutes. Excess lithium aluminum hydride is decomposed with 5 ml. of ethyl acetate and then about 20 ml. of 2 N sulfuric acid is added. The mixture is extracted with ether and the ether layers washed with water, 5% sodium bicarbonate solution, and dried over anhydrous $Na_2SO_4$. The solvent is removed to give a oil which crystallizes from ether-hexane to yield 1.48 g. of 2-hydroxymethyl-7-methoxy-1,2,3,4,4a,9,10,10a-octahydrophenthrene (rings B/C cis, isomer 1) as a colorless solid, M.P. 80–85° C. Crystllization from ether-hexane gives a pure sample, M.P. 80–81.5° C.

This compound exhibits strong antigonadotropic and hypocholesterolemic activity.

What is claimed is:

1. A compound having the formula

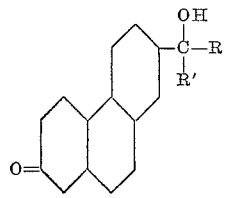

wherein R is selected from the group consisting of hydrogen and lower alkyl and R' is selected from the group consisting of hydrogen, lower alkyl, vinyl and ethynyl.

2. 2 - (1-ethynyl-1-hydroxyethyl)-7-oxo-1,2,3,4,4a,4b,5, 6,7,8,8a,9,10,10a-tetradecahydrophenanthrene.

3. 2 - (1 - ethyl - 1 - hydroxyethyl - 7 - oxo - 1,2,3,4,4a, 4b,5,6,7,8,8a,9,10,10a-tetradecahydrophenanthrene.

4. 2 - (1 - vinyl - 1 - hydroxyethyl) - 7 - oxo - 1,2,3,4, 4a,4b,5,6,7,8,8a,9,10,10a-tetradecahydrophenanthrene.

References Cited by the Examiner

UNITED STATES PATENTS

| | | | |
|---|---|---|---|
| 1,915,334 | 6/1933 | Salzberg et al. | 260—243 |
| 2,228,577 | 1/1941 | Marker | 260—586 |
| 2,362,614 | 11/1944 | Calva | 167—22 |
| 2,781,401 | 2/1957 | Jacobson | 260—617.5 |
| 2,830,093 | 4/1958 | Farinacci | 260—617.5 |
| 2,980,694 | 4/1961 | Sauers et al. | 260—326.5 |
| 3,000,900 | 9/1961 | Tawney | 260—326.5 |

LEON ZITVER, *Primary Examiner.*

HENRY R. JILES, *Examiner.*

JOSE TOVAR, M. JACOB, *Assistant Examiners.*